(12) United States Patent  (10) Patent No.: US 9,288,332 B2
Gallant                    (45) Date of Patent:    *Mar. 15, 2016

(54) SYSTEM AND METHOD FOR PROVIDING HIGH RELIABILITY NETWORK

(71) Applicant: VERISIGN, INC., Reston, VA (US)

(72) Inventor: John Kenneth Gallant, Sterling, VA (US)

(73) Assignee: VERISIGN, INC., Reston, VA (US)

(*) Notice: Subject to any disclaimer, the term of this patent is extended or adjusted under 35 U.S.C. 154(b) by 28 days.

This patent is subject to a terminal disclaimer.

(21) Appl. No.: 14/164,699

(22) Filed: Jan. 27, 2014

(65) Prior Publication Data
US 2014/0140491 A1  May 22, 2014

Related U.S. Application Data

(63) Continuation of application No. 13/229,024, filed on Sep. 9, 2011, now Pat. No. 8,638,914, which is a continuation of application No. 11/509,037, filed on Aug. 24, 2006, now Pat. No. 8,019,063.

(51) Int. Cl.
  H04M 15/00  (2006.01)
  H04M 7/00   (2006.01)
  H04M 3/42   (2006.01)
  H04Q 3/00   (2006.01)
  H04L 29/06  (2006.01)

(52) U.S. Cl.
  CPC ......... *H04M 7/0057* (2013.01); *H04L 65/1066* (2013.01); *H04M 3/42374* (2013.01); *H04Q 3/0029* (2013.01); *H04Q 2213/13103* (2013.01); *H04Q 2213/13106* (2013.01); *H04Q 2213/13167* (2013.01); *H04Q 2213/13345* (2013.01)

(58) Field of Classification Search
  USPC .................. 379/111, 112.01, 112.08, 114.01, 379/114.24, 114.25, 114.28, 114.29, 379/115.01, 121.01, 121.05, 126, 133, 134, 379/229, 230
  See application file for complete search history.

(56) References Cited

U.S. PATENT DOCUMENTS

| 5,659,604 | A  | * | 8/1997  | Beckmann    | H04M 3/2281 379/112.01 |
| 5,809,121 | A  | * | 9/1998  | Elliott     | H04M 15/00 379/116     |
| 5,896,441 | A  |   | 4/1999  | Akazawa et al. |                     |
| 5,923,730 | A  | * | 7/1999  | Takaki      | H04M 3/2254 379/15.02  |
| 5,933,474 | A  |   | 8/1999  | Kipp        |                        |
| 6,205,557 | B1 |   | 3/2001  | Chong et al. |                       |
| 6,393,415 | B1 |   | 5/2002  | Getchius et al. |                    |
| 6,408,063 | B1 |   | 6/2002  | Slotte et al. |                      |
| 6,470,081 | B1 |   | 10/2002 | Sbisa et al. |                       |
| 6,539,082 | B1 |   | 3/2003  | Lowe et al. |                        |
| 6,718,022 | B1 |   | 4/2004  | Ehrlich et al. |                     |
| 6,731,730 | B1 | * | 5/2004  | Zolotov     | H04M 15/00 379/121.05  |
| 6,760,426 | B2 |   | 7/2004  | Sbisa et al. |                       |
| 6,768,793 | B1 |   | 7/2004  | Sbisa et al. |                       |
| 6,920,320 | B2 |   | 7/2005  | Rathunde et al. |                    |
| 7,016,479 | B2 | * | 3/2006  | Flathers    | H04L 12/2854 379/265.13 |
| 7,209,964 | B2 |   | 4/2007  | Dugan et al. |                       |
| 7,295,829 | B2 | * | 11/2007 | Boehmke     | H04M 3/2218 379/112.01 |

(Continued)

*Primary Examiner* — Binh Tieu
(74) *Attorney, Agent, or Firm* — MH2 Technology Law Group, LLP

(57) ABSTRACT

A system and method for providing a high reliability network. Context servers store information about calls in a telecommunications system. Network control elements can obtain call information from the context servers to help make call control and reporting decisions.

20 Claims, 5 Drawing Sheets

(56) References Cited

U.S. PATENT DOCUMENTS

| | | | |
|---|---|---|---|
| 7,529,356 B2 | 5/2009 | Cooke et al. | |
| 7,583,794 B1 | 9/2009 | Croak et al. | |
| 7,609,826 B2 * | 10/2009 | Liu | H04M 15/00 379/114.14 |
| 7,623,651 B2 | 11/2009 | Ju et al. | |
| 7,769,159 B1 * | 8/2010 | Paterik | H04M 3/2218 370/325 |
| 8,098,803 B1 * | 1/2012 | Croak | H04L 12/1417 379/111 |
| 8,254,540 B2 * | 8/2012 | Croak | H04M 15/00 379/112.01 |
| 8,520,816 B2 * | 8/2013 | Croak | H04M 15/00 379/112.01 |
| 8,983,046 B2 * | 3/2015 | Croak | H04M 15/00 370/352 |
| 2002/0064149 A1 | 5/2002 | Elliott et al. | |
| 2002/0161804 A1 | 10/2002 | Chiu et al. | |
| 2004/0001517 A1 | 1/2004 | Lamberton et al. | |
| 2005/0216421 A1 | 9/2005 | Barry et al. | |
| 2005/0281399 A1 | 12/2005 | Moisey et al. | |
| 2006/0002534 A1 | 1/2006 | Lang et al. | |
| 2008/0063165 A1 | 3/2008 | Gallant | |

* cited by examiner

SYSTEM AND METHOD FOR PROVIDING HIGH RELIABILITY NETWORK

CROSS REFERENCE TO RELATED APPLICATION

This application is a continuation of U.S. application Ser. No. 13/229,024, filed Sep. 9, 2011, which is a continuation of U.S. application Ser. No. 11/509,037, filed Aug. 24, 2006 (now U.S. Pat. No. 8,019,063), the entire contents of both of which are incorporated herein by reference.

BACKGROUND OF THE INVENTION

Modern telecommunication networks provide services based on call signaling. The network signaling protocol includes a service layer upon which many of the provided services are implemented. Such services include 1-800 and toll free calling, calling cards, private virtual networks, cellular registration and roaming, prepaid calling, etc.

FIG. 1 is a diagram of such a call signaling-based telecommunication network. The network includes one or more telecommunication switches 110-1 through 110-$m$, a signaling system 120, and one or more network control elements 130-1 through 130-$n$. The telecommunication switches 110 are responsible for connecting and disconnecting a telephone call and are primary originators of call signals (or call messages) during the life of the call. Typically, call signals indicate the call status or include a command to be executed by another network component with regard to the call. The signaling system 120 routes the call signals and other signals between the switches 110 and the network control elements 130. The signaling system 120 may include an intermediary routing node (not shown) that routes signals to the designated switch or control element. The network control elements 130 are responsible for providing the services on the network. The control elements 130 receive and process call signals from the switches 110 and implement the services based on the processed call signals.

An example of a call signaling-based telecommunication network is the Signaling System 7 (SS7) network. The SS7 network includes telecommunication switches called mobile switching centers (MSC), which are used primarily in mobile telephone networks. The SS7 network includes a signaling system to route call signals using a signal transfer point (STP) as an intermediary routing node. The SS7 network also includes network control elements called mobile service control points (SCP), which provide the mobile services on the network.

A goal of call signaling-based telecommunication networks is to ensure high reliability in the provided services. High reliability is more easily provided for services which involve a single call signal during the life of a telephone call, rather than for services which involve multiple call signals, perhaps from different network components, during the life of the call. However, services which involve multiple call signals tend to provide more capabilities and increased functionality for the caller and are therefore more desirable.

As stated previously, services which involve multiple call signals during the life of a telephone call are provided by network control elements. Typically, a subset of the control elements acts as the primary elements on the network for transmitting, receiving, and processing the call signals for a particular service. For reliability, the remaining control elements are used for backup, in the event that the primary elements fail. Accordingly, there is some logic or a method provided by the control elements to ensure that the call signals are correctly routed and processed during both normal and failure modes.

One method commonly used involves the originator of the call signal, i.e., the telecommunication switch, populating the header of the call signal with a string identifying the network control element to which the call signal is to be routed for processing. An intermediary routing node on the network examines the string, consults a routing table to identify the destination network control element, and then routes the call signal to the identified control element. An advantage of this method is that call signals can be easily partitioned between the network control elements. Also, a control element can be used as both a primary element for so-designated call signals and as a backup element for another control element since it is easy to identify, in a call signal, where the call signal is to be routed (or re-routed in the event of a failure). As such, several control elements may be active concurrently.

For example, in the SS7 network, call signals may be set up to go to SCP A as the primary control element for 1-800 and other toll free calling service having telephone numbers in range A, with SCP B as the backup control element if SCP A fails. Similarly, call signals may be set up to go to SCP B as the primary control element for 1-800 and other toll free calling service having telephone numbers in range B, with SCP A as the backup control element if SCP B fails. When a caller makes a 1-800 or other toll free call, an MSC originates the call signals on the network, including an identifier for either SCP A or B (depending on the range within which the 1-800 number falls) in the header of the call signals. An STP examines the call signals, determines from a routing table based on the identifier that the call signals should go to either SCP A or B, and then routes the signal thereto. SCP A or B then processes the call signals in order to establish and maintain the 1-800 or other toll free call for the caller. In the event of a failure of the primary SCP, the routing node routes the call signal to the backup SCP.

However, this method of populating the header of the call signal with a string identifying the destination network control element does not work very well for services with multiple call signals during the life of a telephone call. This is because the call signals can come from different network components which do not use signal headers at all or do not use the same signal formats or consistent strings identifying the destination control element, for example, as in certain prepaid service. As such, the intermediary routing node may not reliably identify an appropriate destination network control element and properly route the signal thereto.

One solution to this problem has been to use only one network control element for all call signals regardless of the service associated with the signal, with the remaining control elements as backups if the one element fails. The primary control element then gets all the call signals from different sources and groups together those belonging to the same telephone call. If the primary element fails, one of the backup elements then receives all the call signals.

This solution, however, is not very efficient because several of the control elements are idle and are only used when there is a primary element failure, while the primary control element works constantly. This is an inefficient use of network resources. Moreover, after sitting idle, there is no guarantee that a backup control element could take over and operate properly, in the event of a primary element failure. What is needed is a way to effectively balance the signals between the control elements and still be able to reliably group together those call signals belonging to the same telephone call and service. If a backup control element is more active, it is more likely to reliably take over and perform properly.

Accordingly, there is a need in the art for a system and method for reliably handling multiple call signals during the life of a telephone call using several network control elements.

DETAILED DESCRIPTION

Figure 1:
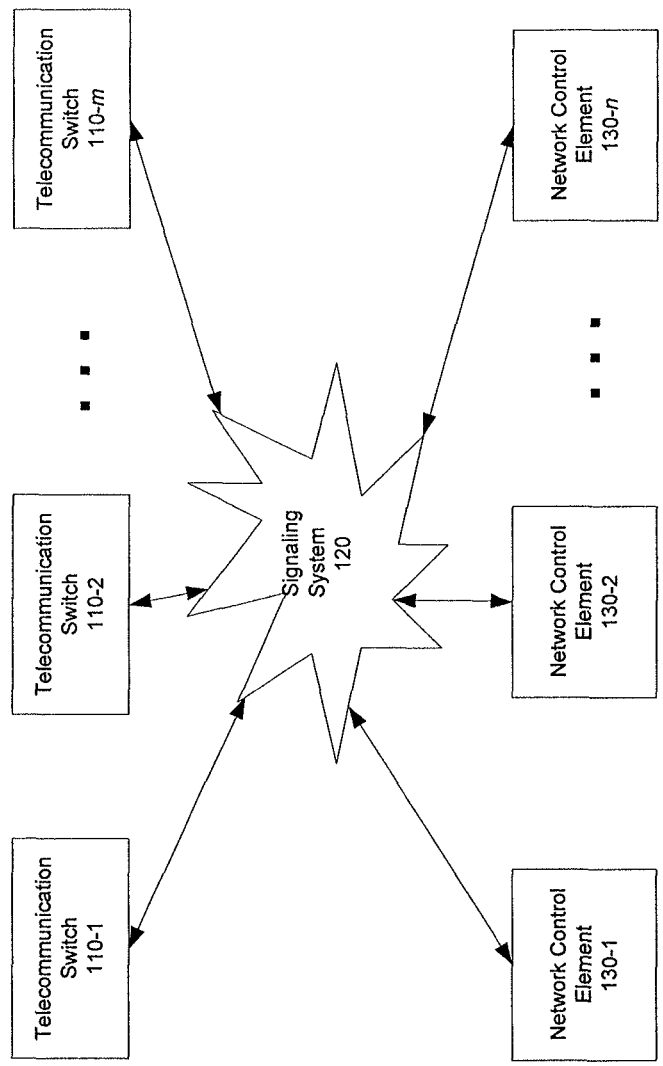
FIG. 1 is a diagram of a prior art telecommunication network.

For several network control elements in a call signaling-based telecommunication network to reliably process multiple call signals associated with a telephone call, each control element must be able to tie the call signal it is currently processing with call signals it and other elements previously processed that are associated with the call. To do this, according to embodiments of the present invention, one or more context servers are provided that a control element may access to obtain information about the context of the call signal currently being processed. This context information may come from the previously processed call signals that are stored in the context servers.

As stated previously, call signals may indicate the call status or include a command to be executed by another network component with regard to the call. For example, a call signal may indicate that a call's status as connected, disconnected, busy, forwarded, answered, timed out, etc. A call signal may also command the control elements to update the call's status, start or stop tolling the call, bill the call, etc.

Context information that the context servers may provide to the control elements about a call signal may include the time the call was connected, disconnected, busy, forwarded, answered, timed out, etc., the calling and called telephone numbers, the amount of prepaid funds available for the call, the number of minutes remaining in a prepaid call, the billing address of the calling party, etc. With context information, a control element may better process its present call signal though never having received any preceding call signals from this call.

For example, suppose a call is connected at 2:00 PM. The call signal to update the status of the call to "connect" is processed by control element A. When the call disconnects, the call signal to update the status of the call to "disconnect" is received by control element B. In order to update the status of the correct call, control element B must have context information about the call. Therefore, control element B must determine what call signals went before and what they meant. In embodiments of the present invention, this may be done by control element B accessing context servers to get the context information of the connect call signal, i.e., the calling number and the connected status. From this information, control element B may reliably change the calling number to the disconnected status.

Embodiments of the present invention are directed to high reliability call signaling-based networks. The present invention advantageously enables several network control elements to work concurrently to process multiple call signals during the life of a telephone call, thereby ensuring high reliability of the services provided on the network. The present invention further provides load balancing between the control elements, which is particularly useful during times of unpredictably high network utilization and when there is a network control element failure.

In one embodiment, a method for processing multiple call signals may include receiving a call signal from a telecommunication switch at a network control element. Upon receipt, the network control element may send requests to one or more context servers for information to determine the context of the call signal. One or more context servers may respond to the control element with information about the call signal context. The control element may then process the call signal based on the received context. This advantageously allows any network control element to tie a received call signal with other call signals associated with a telephone call and then process the received signal, without the call signal itself necessarily having an identifier of the call to which it pertains and/or of the particular network control element that is supposed to handle it.

In another embodiment, a method for processing multiple call signals may include receiving a request for context information from a network control element at a context server. Upon receipt, the context server may retrieve information it has about previous call signals associated with the same telephone call. The context server may send the retrieved information to the network control element so that the control element can process the current call signal. This advantageously allows the network control element to use previously processed call signals, which may have been processed by other network control elements, to process the current call signal.

In still another embodiment, a system may provide one or more network control elements to process multiple call signals during the life of a telephone call and one or more context servers to provide context information so that the network control elements can reliably process the call signals. This advantageously allows multiple call signals associated with the same call to be distributed between the network control elements and still tied together by each network control element in order to process its current call signal.

Figure 2:
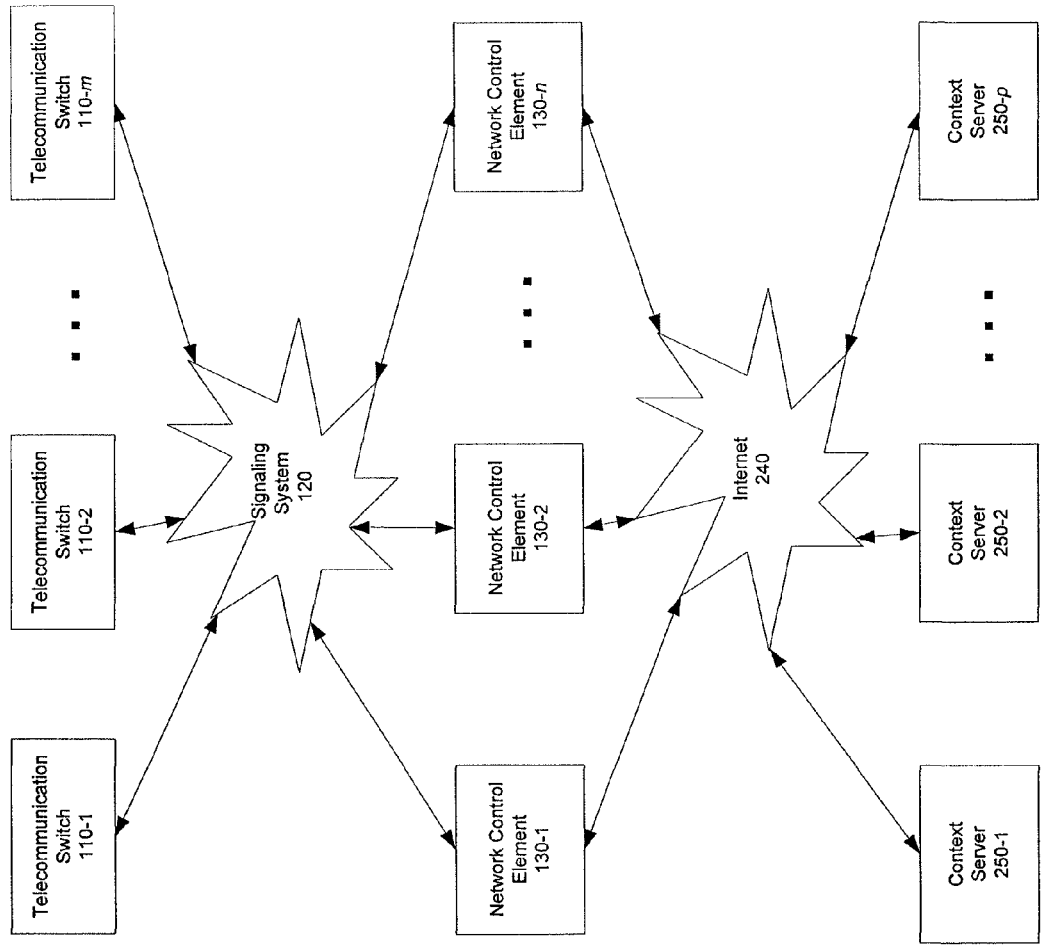
FIG. 2 is a diagram of a telecommunication network for implementing an embodiment of the present invention.

FIG. 2 is a diagram of a telecommunication network for implementing an embodiment of the present invention. The network 200 may include telecommunication switches 110-1 through 110-*m* and network control elements 130-1 through 130-*n*, connected by signaling system 120. The network 200 may further include context servers 250-1 through 250-*p*, connected to the network control elements 130 via internet (or intranet) 240. None of the network components need reside in the same physical location, but may form a distributed network.

The telecommunication switches 110, the network control elements 130, and the signaling system 120 perform as described above regarding FIG. 1.

In an embodiment, an intermediary routing node (not shown) in the signaling system 120 may distribute the call signals originating at the switches 110 between the control elements 130 in a balanced manner. The signals may be distributed by a simple round-robin method. Alternatively, the signals may be distributed by a weighting algorithm according to control element processing capability. Any other method capable of providing a balanced call signal distribution may be used. When a network control element is not available or has failed, the routing node may skip that element when distributing the call signals. After the element becomes available or is repaired, the routing node may resume call signal distribution thereto.

The context servers 250 may receive and store call signals from the network control elements 130. The context server 250 may further retrieve stored call signals and/or information pertaining thereto and forward the same back to the network control elements 130 upon receipt of a request for context information from a network control element 130. The context servers 250 may be any general purpose computer or like device and software capable of performing all or part of the method according to embodiments of the present invention.

Figure 3:
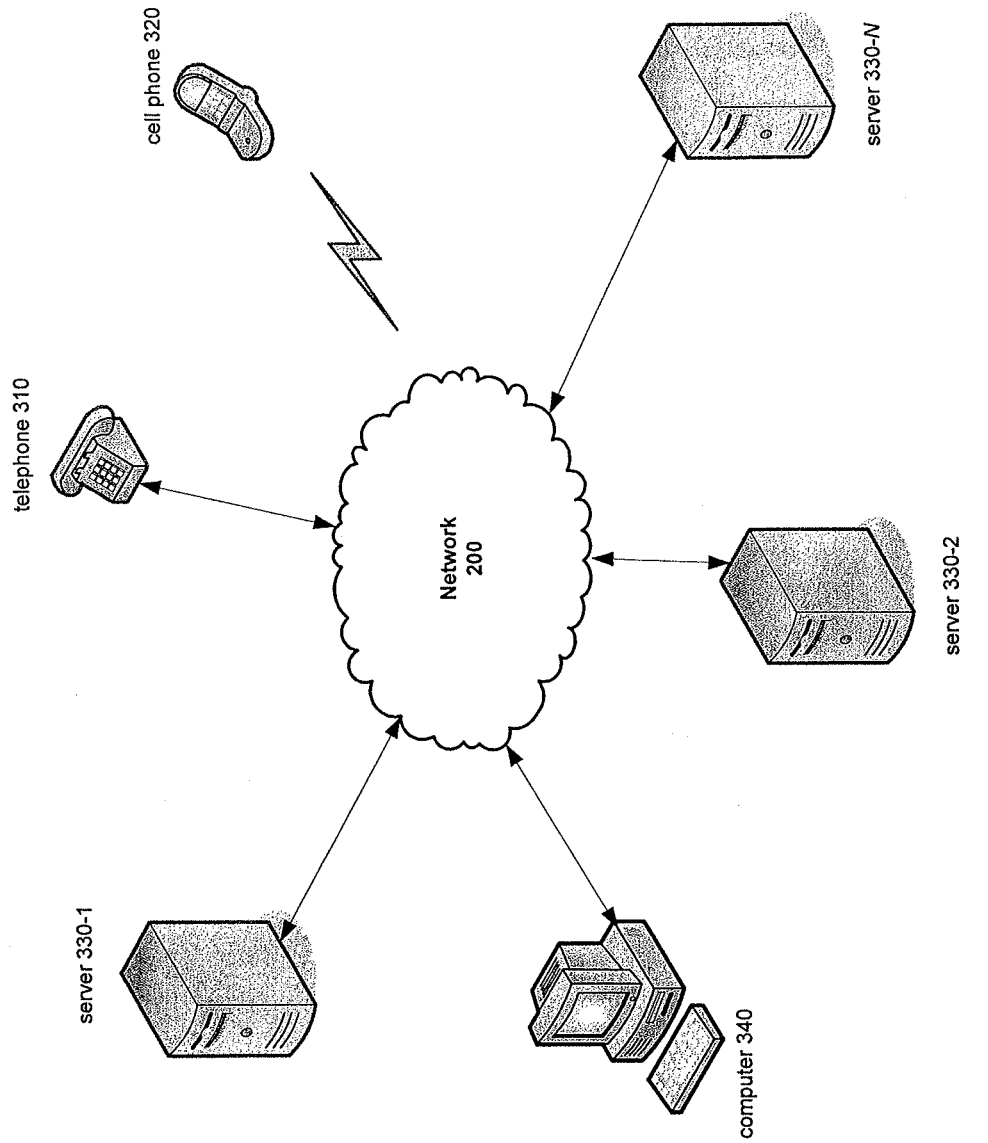
FIG. 3 is a diagram of a telecommunication system for implementing an embodiment of the present invention.

FIG. 3 is a diagram of a telecommunication system for implementing an embodiment of the present invention. The system may include telephones 310, cell phones 320, network computers 340, and network servers 330-1 through 330-N, connected via telecommunication network 200 as described above with regard to FIG. 2. The telephones 310 and cell phones 320 may connect to the network 200 via the telecommunication switches 110. The network computers 340 may provide internet telephony and/or data transmission and connect to the network 200 through the Internet 240. The network servers 330 may provide internet service through which internet telephony, worldwide web connection, and/or data transmission may be made. The network servers 330 may connect to the network 200 through the internet 240. The network 200 may be capable of handling wired, wireless, and internet telephony.

A caller may place a call on the telephone 310, the cell phone 320, or the computer 340. A call may also be forwarded from the servers 330. The call may then be connected via the network 200. During the life of the call, call signals may be generated by the telecommunication switch 110 about the status of the call, e.g., connected, disconnected, busy, etc., or to command the network 200 or any network component to perform some operation related to the call, e.g., connect the call, disconnect the call, bill the call, etc.

Figure 4:
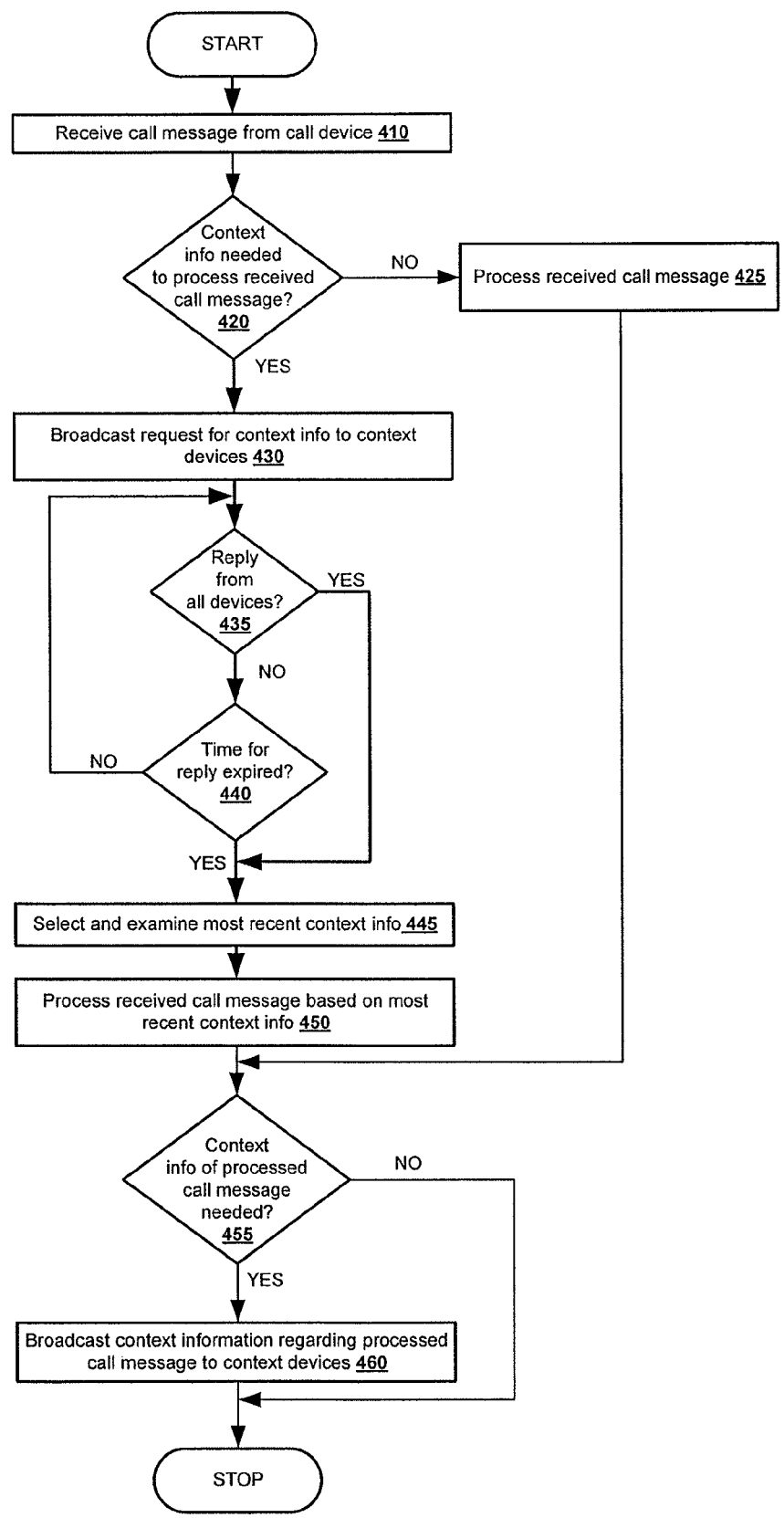
FIG. 4 is a flowchart of a method for providing a high reliability network in accordance with an embodiment of the present invention.

FIG. 4 is a flowchart of a method for processing a call signal using context information according to an embodiment of the present invention. In order to tie call signals associated with the same telephone call together that are received at different times by different network control elements, each network control element may be capable of sending a request for context information to and receiving the requested information back from one or more context servers.

A network control element may receive (410) a call signal from a telecommunication switch. The network control element may then determine (420) whether context information is needed in order to process the call signal. If context information is not needed, the network control element may process (425) the call signal. An example of when the network control element may not need context information is when the headers of the call signals consistently include control element identifiers because the same control element receives all the call signals associated with the call and can reliably tie the signals together. The network control element also may not need context information to process the first call signal in a call. After processing the call signal, the network control element may broadcast (455) the processed call signal and/or context information to the context servers for storage. Alternatively, the network control element may multicast or otherwise send the processed call signal and/or context information to one or more context servers.

If context information is needed (420), the network control element may broadcast (430) (or multicast or directly send) a request for context information about the call signal to all (or some, respectively) of the active context servers. The request may include a data key, e.g., a telephone number, billing account number, etc., which identifies the call.

After sending the request for context information, the network control element may wait (435) for replies from all or some the context servers, where the replies include the requested context information that matches the data key of the current call signal. This match indicates that the context information and the current call signal are associated with the same call. The context information may include a previously processed call signal and/or information about the previously processed signal. Information about the call signals may include the data key, the timestamp, i.e., the time that the call signal was originally received by a network control element from a telecommunication switch, the nature of the signal, e.g., whether it is a disconnect, connect, status, etc., signal.

If the network control element does not receive replies from all the relevant context servers within a specified time period (440), the network control element may stop waiting and examine the replies received within the time period. On the other hand, if the network control element receives replies from all the context servers before the time period expires (435), the network control element may stop waiting and proceed to examine the replies. Any appropriate method of selecting among one or more replies to consider is encompassed by the present invention.

The network control element may select (445) the received context information that has the most recent timestamp. This is because this context information may reflect the most recent status and activity of the call. As such, the current call signal may logically follow the signal to which the context information pertains, thereby efficiently narrowing the possibilities of what the current call signal means.

The network control element may then process (450) the current call signal based on the selected context information. If the processed call signal and/or its context information is to be used later (455), e.g., either during the current call for context processing of a subsequent call message or after the current call ends to update the call context for later tracing, the network control element may broadcast (460) the processed call signal and/or context information to the context servers for storage. Otherwise, the network control element may omit the broadcasting.

Figure 5:
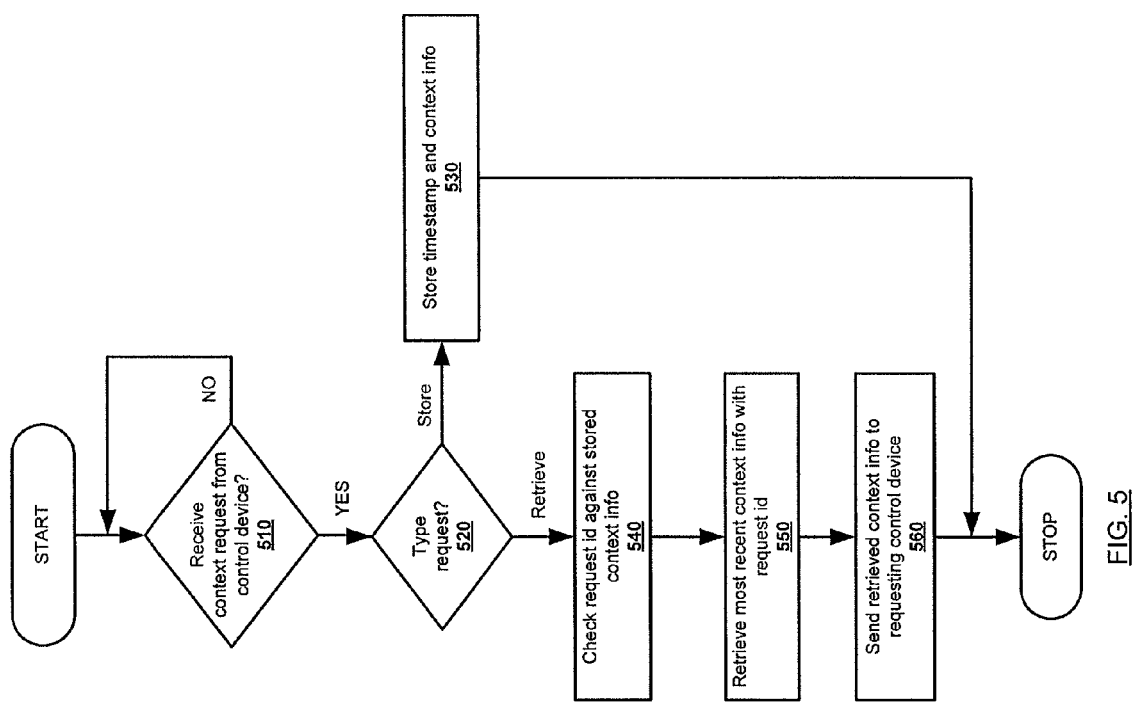
FIG. 5 is a flowchart of a method for providing a high reliability network in accordance with another embodiment of the present invention.

FIG. 5 is a flowchart of a method for retrieving context information according to an embodiment of the present invention. A context server may await (510) a request from a network control element. The request from the control element may be broadcast to all the context servers, to a subset of the servers, or sent to one server. To enhance high speed performance, the context server need not acknowledge the request.

If the request is to store (520) the call signal just processed by the network control element, the context server may store (530) the timestamp, i.e., the time that the network control element received the call signal from a telecommunication switch, and the call signal, which includes the data key. In one embodiment, the context server may generate additional context information associated with the call signal and store that information for later use by the network control elements.

If the request is to retrieve (520) context information about the call signal currently received by the network control element, the context server may check (540) previously processed call signals that are stored in the server database to identify those having the same data key as the request.

If the context server has more than one previously processed call signal that matches the data key of the current call signal, the context server may retrieve (550) context information about the most recent of the previously processed call signals that match. If the context server only has one match, context information about that match may be retrieved. If there are no matches, the context server does not retrieve context information. The context servers may send (560) the retrieved context information to the requesting network control element.

In one embodiment, all the context servers may include at least some of the same context information. This level of redundancy provides the highest network reliability as long as one context server does not fail.

In an alternate embodiment, where there are storage or processor capacity limitations in the servers, for example, a partitioning rule may be applied at the network control elements to designate a subset of context servers to use. For example, a network control element may have assigned thereto context servers A-C; whereas, another network control element may have assigned thereto context servers D-F. Or a network control element may access context servers A-C if the call signal data key is within a certain range and context servers D-F if the call signal data key is within a different range. Other such partitioning rules may also be applied.

In another alternate embodiment, a partitioning rule may be dynamically applied while the system is running in order to provide context server scalability. For example, the number of subsets of context servers and/or the number of servers per subset may increase or decrease based on the performance and transaction requirements for the system.

An example of an implementation of embodiments of this invention is a wireless prepaid service in which multiple network components from multiple vendors work together to provide the prepaid service as set forth in the IS-826 standard in the ANSI-41 body of wireless standards.

The wireless telecommunication system may include telecommunication switches, i.e., mobile switching centers (MSC), network control elements, i.e., service control points (SCP), and context servers.

There are several call stages that a wireless prepaid call may go through during the life of the call. Those relevant for this example include: (a) an analysis stage, in which the MSC receives a mobile originated or terminated call, analyzes the dialed digits, and then awaits instructions from the SCP on whether to complete the call and where to route it once completed; (b) an answer stage, in which the call is routed for connection and the receiving party answers the call; (c) a busy stage, in which the call is routed for connection but, instead of the receiving party answering, the receiving end is busy; and (d) a disconnect stage, in which one of the parties hangs up the call and the MSC informs the SCP that the call is disconnected.

In accordance with an embodiment of the present invention, after receiving a call signal, an SCP may request context information from the context servers about the call. The data key for each signal sent or received is a call id, which ties together multiple messages that are involved in the same call. As such, the SCP and the context server may readily identify messages from the same call via the call id. The data key included in the request can have different parts, such as a billing identification assigned by the MSC, a flag which tells whether the call was a mobile originated or terminated call, etc. In some cases, the billing identification may be sufficient to tie call signals associated with a given call together. In other cases, the mobile originated/terminated flag may be used to ensure that the data key is unique. In practice, the data key can cycle around every so often in a prepaid service. If this is the case, a data key should not continue to be used for longer than that cycle period.

In this example, the following call signals may originate at the MSC and be processed at the SCP during the life of a wireless prepaid call: "store-context-message," "get-and-update-call-answer-message," "get-and-update-call-disconnect-message," "get-and-delete-context-message," or "get-and-update-prepaid-timer-message." The "get-and-update" call signal combines two operations "get" and "update" on the context server atomically. This advantageously avoids an out-of-order scenario, where the context server would receive the "update" signal prior to the "get" signal and therefore illogically try to update the call message on the context server before first finding the message thereon. By combining the two operations in one command, the context server may be assured of performing them in the appropriate order. Similarly, the "get-and-delete" call signal combines the "get" and "delete" operations on the context server atomically.

When the prepaid call reaches the analysis stage, the MSC may send a call signal to the SCP. The SCP may then access the prepaid subscriber's information to determine whether the subscriber has sufficient funds to complete the call and, if so, how long the call can last based on the amount of funds. The prepaid subscriber may be the caller, the called party, a third party, or a combination thereof. The SCP may broadcast "store-context-message" to the context servers for storage, where the message indicates the calling and called numbers, the amount of time the call can last, and related information. Since this is the first call signal for this prepaid call, the SCP may not require context information from the context servers in order to process the call signal. If there are sufficient funds to complete the call, the SCP may then send a message to the MSC to continue the call. Otherwise, the SCP may send a message to the MSC to discontinue the call.

When the prepaid call reaches the answer stage, the MSC may send a call signal to the SCP, which may broadcast "get-and-update-call-answer-message" to the context servers. This is a request for context information from the context servers regarding the previous call signal "store-context-message." The context servers may update the answer time in their databases and return the answer time and the amount of time the call can last to the SCP as context information to use to process "get-and-update-call-answer-message." The SCP may then process "get-and-update-call-answer-message," which may cause a prepaid timer for the call to start. The SCP may send a message to the MSC to tear the call down after the timer expires. If the call ends because the prepaid timer is expired, the SCP may broadcast "get-and-update-prepaid-timer-message" to the context servers, which may be accessed by other SCPs so that any backup prepaid timers thereon for the call may be reset.

When the prepaid call reaches the disconnect stage, the MSC may send a call signal to the SCP that the call has been disconnected. The SCP may broadcast "get-and-delete-context-message" after the call is disconnected and the SCP has the information it needs from the context servers. This is a request for context information from the context servers regarding the previous call signal "get-and-update-call-answer-message." The context servers may update the disconnect time in their databases and return the answer time, the disconnect time, and the calling and called numbers to the SCP as context information to use to process "get-and-delete-context-message." The SCP may then process "get-and-delete-context-message," which may cause an appropriate billing event to occur. The context servers may purge the context information from their databases.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method comprising:
receiving, by a network control device in a network, a message associated with a computer system requesting one or more services provided by the network;
sending, by the network control device, a request to one or more context servers for context information about the message, wherein the request includes a data key that identifies the message;
receiving, by the network control device, the context information from at least one of the context servers, wherein the context information includes identification information that matches the data key, and a timestamp of a previously processed message associated with the computer system requesting the one or more services; and
processing, by the network control device, the message based on the context information.

2. The method of claim 1, wherein the context information includes a plurality of timestamps associated with a plurality of previously processed messages, and the method further comprising:
selecting, by the network control device, context information associated with a most recent timestamp; and
processing, by the network control device, the message based on the context information associated with the most recent timestamp.

3. The method of claim 1, wherein the timestamp indicates when the previously processed message was received from the computer system.

4. The method of claim 1, wherein the one or more services comprise at least one of internet telephony or data transmission.

5. The method of claim 1, wherein receiving the message comprises receiving the message according to a round robin method.

6. The method of claim 1, wherein receiving the message comprises receiving the message according to a weighted method, wherein weighting is based on message handling capability.

7. The method of claim 1, the method further comprising:
sending the message processed by the network control device to at least one of the context servers for responding to a subsequent request for information.

8. A network control device, comprising:
one or more memory devices storing instructions; and
one or more processors coupled to the one or more memory devices, the one or more processors operable to execute the instructions to perform a method comprising:
receiving a message associated with a computer system requesting one or more services provided by a network;
sending a request to one or more context servers for context information about the message, wherein the request includes a data key that identifies the message;
receiving the context information from at least one of the context servers, wherein the context information includes identification information that matches the data key, and a timestamp of a previously processed message associated with the computer system requesting the one or more services; and
processing the message based on the context information.

9. The network control device of claim 8, wherein the context information includes a plurality of timestamps associated with a plurality of previously processed messages, and the method further comprising:
selecting context information associated with a most recent timestamp; and
processing the message based on the context information associated with the most recent timestamp.

10. The network control device of claim 8, wherein the timestamp indicates when the previously processed message was received from the computer system.

11. The network control device of claim 8, wherein the one or more services comprise at least one of internet telephony or data transmission.

12. The network control device of claim 8, wherein receiving the message comprises receiving the message according to a round robin method.

13. The network control device of claim 8, wherein receiving the message comprises receiving the message according to a weighted method, wherein weighting is based on message handling capability.

14. The network control device of claim 8, the method further comprising:
sending the message processed by the network control device to at least one of the context servers for responding to a subsequent request for information.

15. A non-transitory computer readable medium comprising instructions for causing one or more processors to perform a method comprising:
receiving a message associated with a computer system requesting one or more services provided by a network;
sending a request to one or more context servers for context information about the message, wherein the request includes a data key that identifies the message;
receiving the context information from at least one of the context servers, wherein the context information includes identification information that matches the data key, and a timestamp of a previously processed message associated with the computer system requesting the one or more services; and
processing the message based on the context information.

16. The non-transitory computer readable medium of claim 15, wherein the context information includes a plurality of timestamps associated with a plurality of previously processed messages, and the method further comprising:
selecting context information associated with a most recent timestamp; and
processing the message based on the context information associated with the most recent timestamp.

17. The non-transitory computer readable medium of claim 15, wherein the timestamp indicates when the previously processed message was received from the computer system.

18. The non-transitory computer readable medium of claim 15, wherein the one or more services comprise at least one of internet telephony or data transmission.

19. A method comprising:
receiving, from a network control device in a network, a request for context information about a message associated with a computer system requesting one or more services provided by the network, wherein the request includes a data key that identifies the message;
determining, by a context server, the context information, wherein the context information includes identification information that matches the data key, and a timestamp of a previously processed message associated with the computer system requesting the one or more services; and sending, by the context server, the context information to the network control device, wherein the network control device processes the message based on the context information.

20. The method of claim 19, wherein the one or more services comprise at least one of internet telephony or data transmission.

* * * * *